(12) United States Patent (10) Patent No.: US 7,787,867 B2
Berger et al. (45) Date of Patent: Aug. 31, 2010

(54) MESSAGE ACCESSING

(75) Inventors: Adam L. Berger, Pittsburgh, PA (US);
Vincent Broz, Pittsburgh, PA (US)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 10/504,610

(22) PCT Filed: Feb. 10, 2003

(86) PCT No.: PCT/US03/04143

§ 371 (c)(1),
(2), (4) Date: Jun. 7, 2005

(87) PCT Pub. No.: WO03/069438

PCT Pub. Date: Aug. 21, 2003

(65) Prior Publication Data

US 2006/0166650 A1 Jul. 27, 2006

Related U.S. Application Data

(63) Continuation-in-part of application No. 10/076,132, filed on Feb. 13, 2002.

(51) Int. Cl.
*H04L 12/58* (2006.01)
(52) U.S. Cl. ............ 455/413; 455/412.1; 455/566
(58) Field of Classification Search ........... 455/412.1, 455/413, 414.1, 415, 466, 566, 411, 412.2, 455/417; 709/204, 206; 379/93.17, 93.24, 379/67.1, 88.13, 100.01, 100.08, 142.06, 379/201.01, 88.12, 88.11, 88.22, 93.08, 114.2
See application file for complete search history.

(56) References Cited

U.S. PATENT DOCUMENTS

| | | | |
|---|---|---|---|
| 5,481,590 A | 1/1996 | Grimes | |
| 5,608,786 A | 3/1997 | Gordon | |
| 5,704,029 A | 12/1997 | Wright | |
| 5,797,098 A | 8/1998 | Schroeder et al. | |
| 6,125,287 A | 9/2000 | Cushman et al. | |
| 6,181,931 B1 | 1/2001 | Alldredge | |
| 6,301,484 B1 * | 10/2001 | Rogers et al. | ............ 455/466 |
| 6,333,973 B1 | 12/2001 | Smith et al. | |
| 6,408,191 B1 | 6/2002 | Blanchard et al. | |
| 6,553,220 B1 | 4/2003 | Marks | |

(Continued)

FOREIGN PATENT DOCUMENTS

WO   WO 01/50701 A2   7/2001

(Continued)

OTHER PUBLICATIONS

Cisco Unity User Guide, Cisco Systems, Inc., 2001, 122 pages.

*Primary Examiner*—Jean A Gelin
(74) *Attorney, Agent, or Firm*—Ditthavong Mori & Steiner, P.C.

(57) ABSTRACT

A request to retrieve a message, such as a voice mail message or an email message, may be provided by a user a of an electronic device. The message has one of at least two different presentation modes by which it may be revealed to the user at the electronic device. The message is retrieved using one of at least two different communication networks depending on a presentation mode by which the message may be revealed.

37 Claims, 7 Drawing Sheets

U.S. PATENT DOCUMENTS

Figure 1:
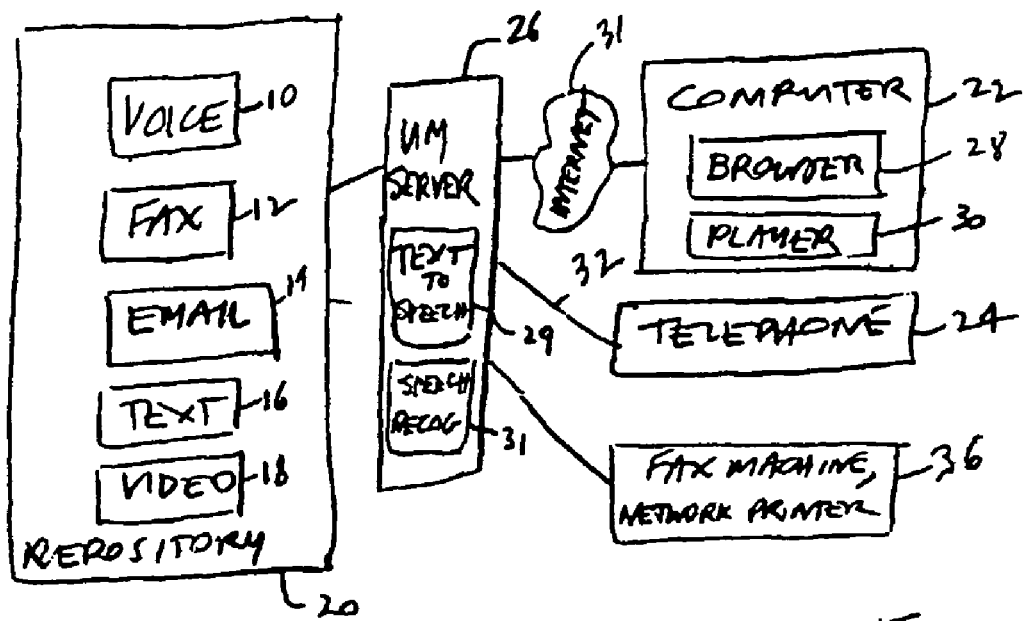

| | | | |
|---|---|---|---|
| 6,873,861 B2 * | 3/2005 | Awada et al. | 455/566 |
| 7,167,728 B1 * | 1/2007 | Wagner et al. | 455/566 |
| 7,197,120 B2 * | 3/2007 | Luehrig et al. | 379/88.14 |
| 7,295,836 B2 * | 11/2007 | Yach et al. | 455/415 |
| 7,349,528 B2 * | 3/2008 | Schmidt et al. | 379/88.13 |
| 2002/0098831 A1 * | 7/2002 | Castell et al. | 455/413 |
| 2003/0147512 A1 * | 8/2003 | Abburi | 379/88.22 |

FOREIGN PATENT DOCUMENTS

| | | |
|---|---|---|
| WO | WO 01/50701 A3 | 7/2001 |
| WO | WO 02/087199 A1 | 10/2002 |

* cited by examiner

```
<?xml version="1.0"?>
<!DOCTYPE wml PUBLIC "-//WAPFORUM//DTD WML 1.1//EN"
"http://www.wapforum.org/DTD/wml_1.1.xml">
<wml>
<card>
<p align="left" mode="nowrap">
<b>Messages</b>
<select>
<option onpick="http://www.x.com/email.jsp?x=97236482342">George Smith
11:00AM </option>
<option onpick="http://www.x.com/email.jsp?x=19874534">Sally Stewart
9:49AM</option>
<option onpick="wtai://wp/mc;+18005551212,91873487632">Voice message
Fri 11:41PM</option>
<option onpick="http://www.x.com/email.jsp?x=92873374923">Sally Stewart
Fri 11:33PM</option>
<option onpick="wtai://wp/mc;+18005551212,929384672112">Voice message
Fri 9:10PM</option>
</select>
</p>
</card>
</wml>
```

FIGURE 5

US 7,787,867 B2

MESSAGE ACCESSING

CROSS REFERENCE TO RELATED APPLICATIONS

The present application is a filing under 35 U.S.C. 371 of International Application No. PCT/US03/04143, which was filed on Feb. 10, 2003 and which claims priority to U.S. patent application Ser. No. 10/076,132, which was filed on Feb. 13, 2002. The contents of both PCT/US03/04143 and U.S. patent application Ser. No. 10/076,132 are incorporated herein by reference.

BACKGROUND

In unified messaging (UM) (FIG. 1), for example, an individual's different messaging systems—voice 10, fax 12, email 14, text 16, video 18, etc.—are consolidated in a single repository 20. The individual can access the messages through a remote UM messaging server 26 using different modes, for example, through the Internet 31 from a web browser 28 of a computer 22 or by a dial-up call 32 from a telephone 24.

In the case of computer access, text messages are downloaded and displayed to the user. Voice messages are downloaded to the computer and rendered as digitized sound (e.g., .WAV) files or streamed to the computer (using streaming media server software from companies like Real.com and Shoutcast) and performed using real-time media playing software 30. The user can reply to a message or generate a new message by sending an email. An Internet-enabled computer may also access a UM server using instant messaging (IM) applications or voice-over-IP/Internet telephony.

In the case of telephone access, after a user's validation code is authenticated in response to the user interactively keying or speaking the code, the UM server plays back his messages. Voice messages are played back as originally recorded, and text messages (email, SMS, instant messaging, faxes) are played back by a text-to-speech voice synthesis engine 29. An individual can reply to a message or generate a new message by placing a voice call.

Access to the messages in a repository can also be obtained at a user's fax machine or networked printer 36. The user registers the fax machine or networked printer with the UM message server, which then spools his text messages to the machine or printer. Voice messages can either be elided or automatically transcribed to text using a speech recognition system 31. The fax machine and the networked printer 36 provide only a unidirectional or read-only access mode, unlike the web browser 28 and the telephone 24.

An advantage of using a computer rather than a telephone to access messages is that the user sees his email messages, rather than only hearing them. When viewing a text message, he can scroll backward and forward through the message, re-read parts of the message, skip over uninteresting parts, pause to show the message to someone else, and so on. This flexibility is more difficult to provide when accessing text messages through a voice-only interface. Typical voice interfaces read every word of an email, for example, even a CC list, which could contain many names.

The advantages of both computer and phone message accessing are becoming available through integrated devices such as mobile phones equipped with Internet browsers. Such phones can interact with web servers using standard hypertext transfer protocol (HTTP), but their small screens are capable of displaying only a small amount of information. The phones also typically have limited memory capability, limited bandwidth, and cannot render some common types of files in their native formats, for example, HTML, GIF, JPEG, MPEG, WAV, PDF, MSWord, PowerPoint, and Excel.

SUMMARY

In general, in one aspect, the invention features a method that includes (a) enabling a user of a wireless phone to make successive selections of messages from a list of messages displayed on the phone, the list including both voice messages and text messages, the selections including voice messages and text messages in any arbitrary order, and (b) without requiring any different action by the user, switching back and forth between responding to selections of voice messages by audibly playing back the messages to the user and responding to selections of text messages by displaying at least portions of the messages.

In general, in another aspect, the invention features a method that includes, in response to a user selecting a voice message identified on a display of a wireless phone, (a) automatically initiating a call to a voice message system on which the voice message is stored, (b) having the voice message system authenticate the call, and (c) receiving an audibly played back version of the voice message from the voice message system.

In general, in another aspect, the invention features a method that includes, at a wireless phone, (a) enabling a user to invoke links associated with voice messages and non-voice messages to be retrieved, the links being displayed to the user, and (b) at the wireless phone, switching automatically between responding to invocation of a voice message link by dialing a telephone number associated with the link, and responding to invocation of a non-voice message link in a manner other than dialing a telephone number.

In general, in another aspect, the invention features a method that includes, at a wireless phone, in response to selection by a user of a voice message to be retrieved, dialing a string that includes a phone number of a voice message system and digits that are sufficient to enable the voice message system server to identify the user and the selected message.

In general, in another aspect, the invention features a method that includes, at a wireless phone, receiving data that (a) identifies a remotely stored message belonging to a user of the phone and (b) includes information that (i) associates the message with the user and (ii) is encoded to restrict unauthorized access by others, and in response to a request by the user for retrieval of the message, returning the encoded information to a server for use in authentication.

Implementations of the invention may include one or more of the following features. The information is generated by a hashing algorithm. The data includes an index identifying the message from among other messages belonging to the user. The encoded information is also stored for use by the server and is automatically deleted from the server based on its aging.

In general, in another aspect, the invention features a method that includes (a) receiving from a user at an electronic device a request to retrieve a message directed to the user, the message having one of at least two different presentation modes by which it may be revealed to the user at the electronic device, and (b) retrieving the message using one of at least two different communication networks depending on a presentation mode by which the message may be revealed.

Implementations of the invention may include one or more of the following features. The electronic device comprises a wireless device. The wireless device comprises a telephone. One of the modes comprises performance of a multimedia message. The multimedia message comprises a voice message. One of the modes comprises displaying characters.

The retrieving comprises requesting the message from a message server. One of the modes comprises performance of a multimedia message, and the retrieving of the multimedia message comprises initiating a dial-up phone call to a message server. The multimedia message comprises a voice message and the retrieving includes receiving a spoken version of the voice message. One of the modes comprises displaying characters, and the retrieving of the message comprises sending a request through a network to a message server. At the electronic device, information is received identifying messages directed to the user, and the information is provided to the user at the electronic device for selection of a message by the user. The information includes uniform resource locator information that enables accessing the messages through at least one of the communication networks. The information includes a phone number at which a message can be retrieved. The identifying information is received through a communication network. The identifying information includes information identifying a user and a message number associated with each of the messages. The information identifying the user and the message number is encoded securely. The encoded information is included in the request to retrieve. The information is stored remotely from the electronic device, the information permitting a server to respond to selection of the message even though communication between the server and the electronic device conforms to a stateless protocol.

In general, in another aspect, the invention features a method that includes (a) informing a user of an electronic device of messages that are available for retrieval, each of the messages having one of at least two different presentation modes by which it may be revealed to the user at the electronic device, (b) receiving from the user a selection of one of the messages to be retrieved, the selection being made in a manner that is unrelated to the presentation mode by which it may be revealed, (c) revealing the message to the user in its presentation mode, (d) receiving from the user a selection of another one of the messages to be retrieved, the selection being made in a manner that is unrelated the presentation mode by which the other message may be revealed, and (e) revealing the other message to the user in its presentation mode.

Implementations of the invention may include one or more of the following features. The informing includes displaying a list of the messages to the user. The receiving includes enabling the user to indicate a selection through a graphical user interface. The revealing includes displaying a text message or playing a voice message.

In general, in another aspect, the invention features a method that includes providing to an electronic device, information that is configured to enable the electronic device: to retrieve messages using at least two different communication networks depending on a presentation mode by which each of the messages may be revealed, the electronic device being enabled to a request for a message, and to enable a user to select messages in a manner that is unrelated to the presentation mode by which the messages may be revealed.

Implementations of the invention may include one or more of the following features. The information that is provided to the electronic device is expressed in a mark-up language. The information that is provided to the electronic device is encoded to prevent loss.

In general, in another aspect, the invention features a method that includes enabling a user of an electronic device to make a selection of a message to be retrieved from a message server, in response to the selection, issuing a string of characters that includes a phone number that is associated with the message and is capable of causing the electronic device to execute a phone call to the server, and a character string that identifies the user and enables the server to authenticate the user.

Other advantages and features will become apparent from the following description and from the claims.

Figure 2:
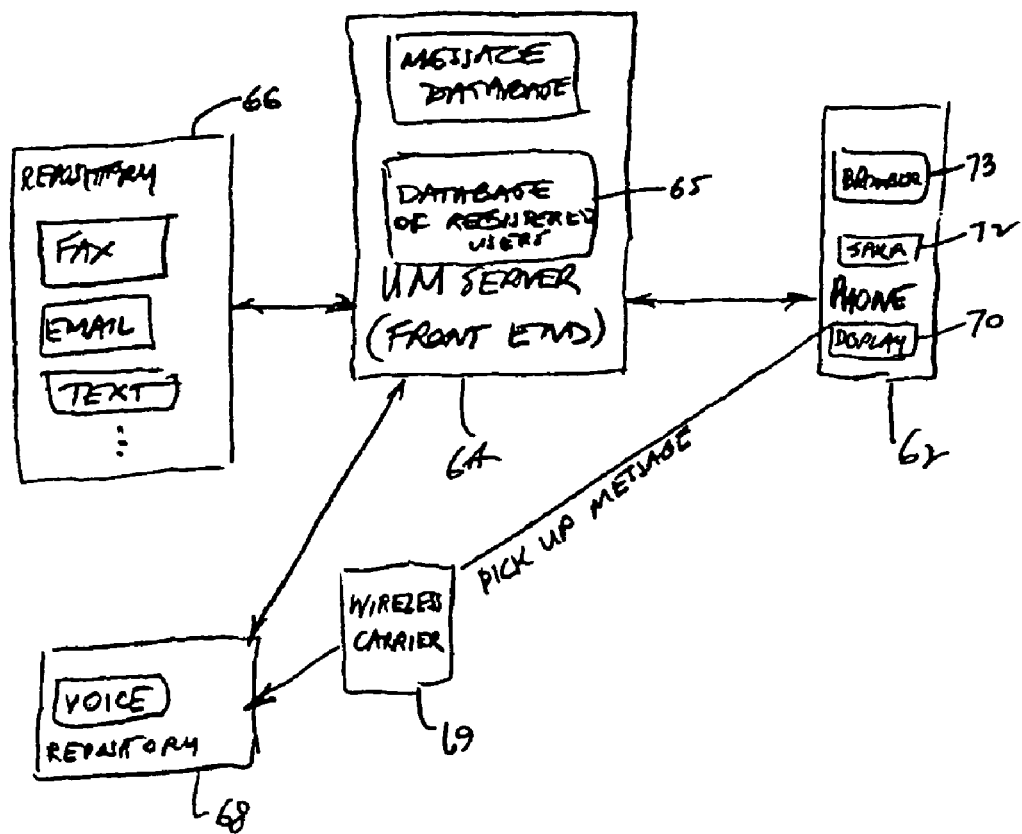
Figure 3:
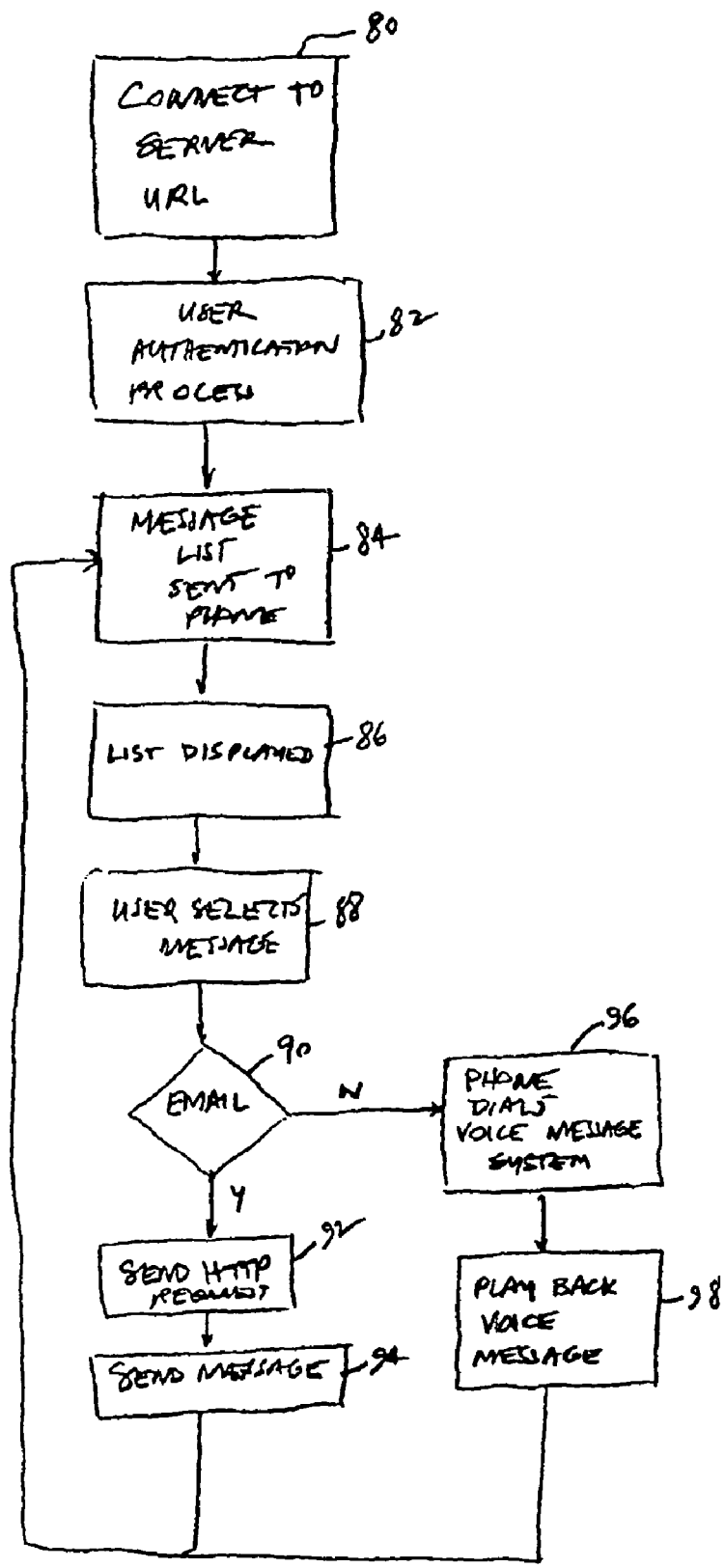
Figure 4:
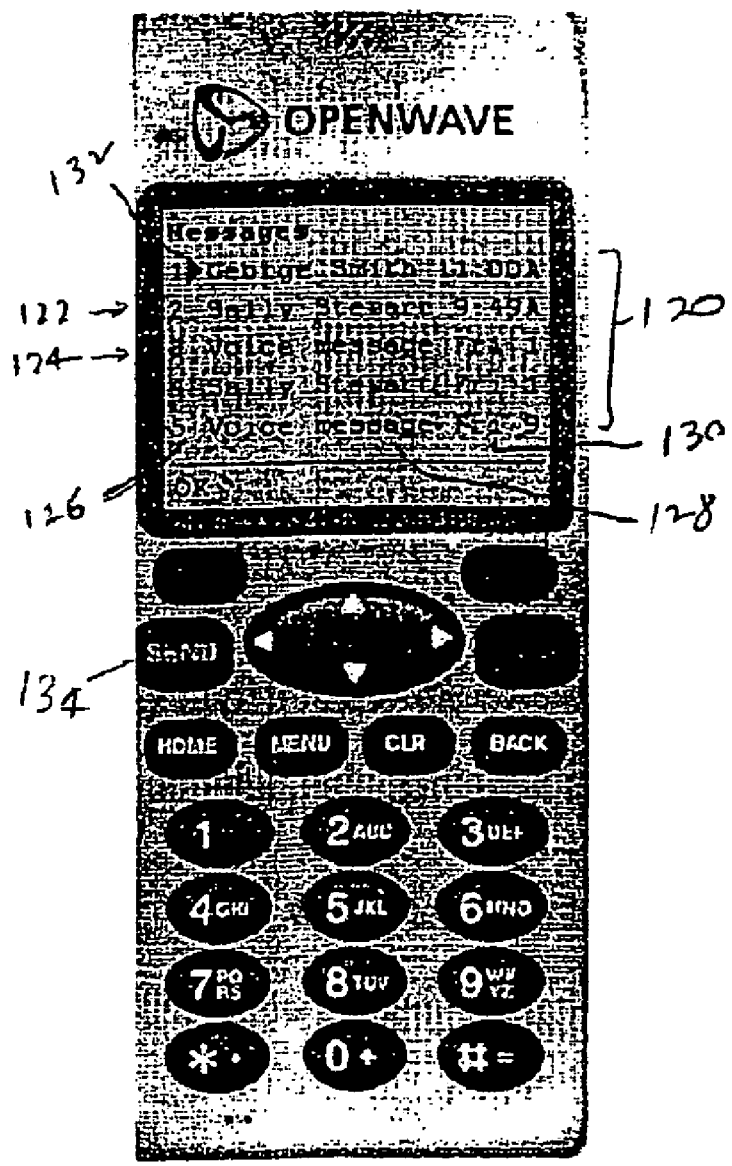
Figure 6:
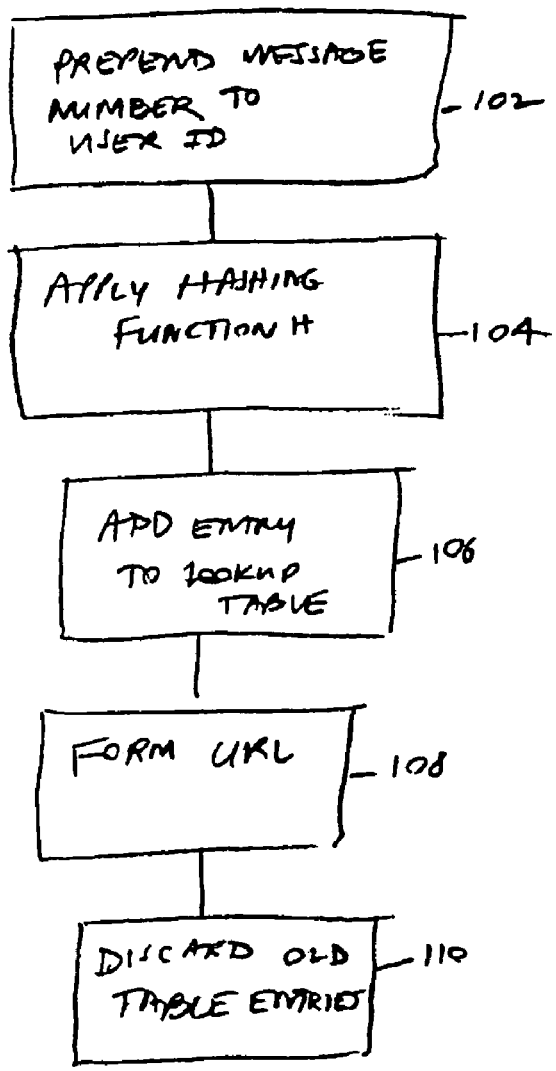
Figure 7:
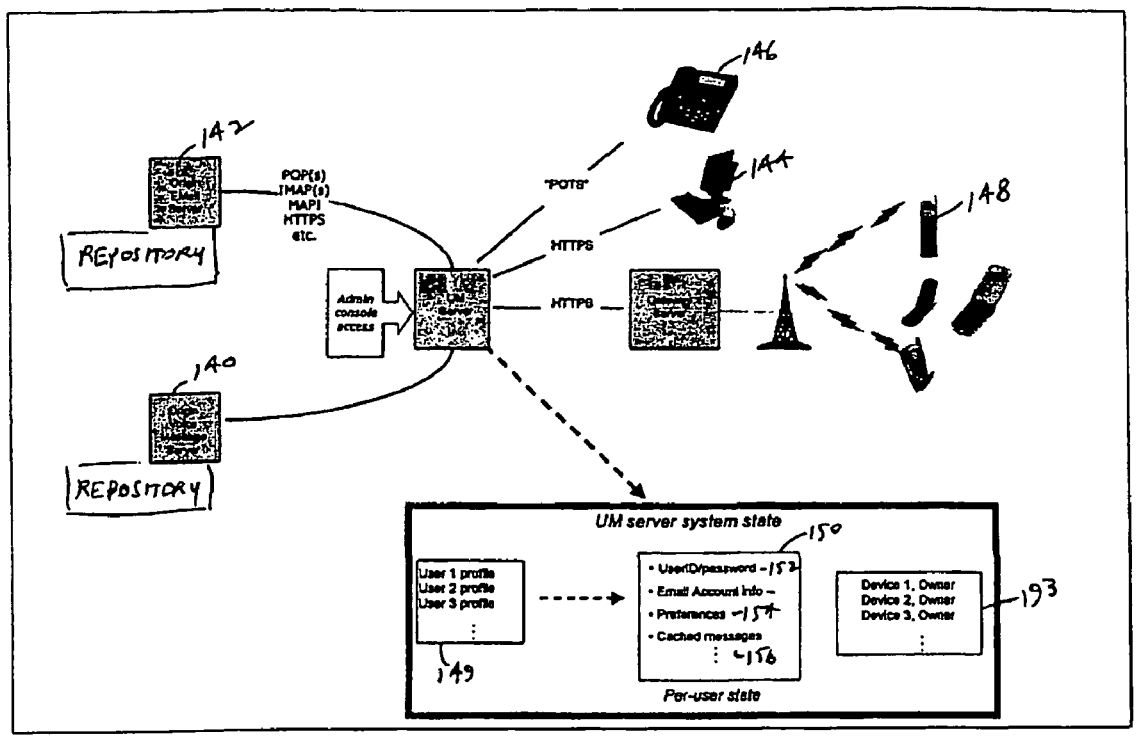

DESCRIPTION (FIG. 1 is a block diagram of a messaging system.
FIG. 2 is a block diagram of a messaging system.
FIG. 3 is a flowchart.
FIG. 4 shows a mobile phone.
FIG. 5 shows source code of a page.
FIG. 6 is a flowchart.
FIG. 7 is a block diagram of a messaging system.)

Unified message access to both voice and text messages can be provided through a simple seamless user interface even for users of a device, such as a mobile phone, which does not have enough communication bandwidth, memory, or processing capacity to effectively handle digitized audio information. The interface can be arranged so that the user is not required to perform two different operations to access voice messages and email messages.

In one simple approach, the UM server could give a user access to both voice messages and email messages on his Internet-enabled phone by simply treating the web browser of the phone the same way the UM server treats a web browser running on a standard personal computer. The UM server would send to the phone's browser both email messages and digitized audio corresponding to voice messages to be played by the audio-playing application resident on the phone, using HTTP or HTTPS as the transport mechanism in both cases. If a user wished to listen to all his messages, including textual ones, or read all his messages, including voice ones, a text-to-speech or speech-to-text component could be applied at the server or the mobile device.

Another approach, which does not burden the mobile phone with processing digital voice message data and does not require the mobile phone to support the processing of digitized audio files, uses the support for hyperlinks to phone numbers that is provided by typical wireless application protocol (WAP) web browsers installed on mobile phones. In addition, one can develop a web browser application for emergent phone-based operating systems such as J2ME™ (available from Sun Microsystems), and BREW™ (available from Qualcomm Incorporated) which support hyperlinked phone numbers. By a hyperlinked phone number, we mean a link that can be invoked by a user and which has an associated phone number that is automatically dialed when the link is invoked. When the call is disconnected, the phone reverts back to its state (web access mode) that existed prior to the call. This feature enables a seamless transition back and forth between a state in which email messages are accessed through the Internet (using HTTP) and a state in which voice messages are accessed through cellular or land-line telephone communication.

As shown in FIG. 2, a session in which messages are made available to a mobile phone 62 is managed by a UM messaging server (also called a UM front end) 64. The UM server is a computer (including a processor, memory, mass storage, communication devices, and input/output devices) running software that enables it operate as a web server in its interaction with the phone 62 and as a client with respect to a repository 66. The UM messaging server has access to FAX, emails, and other text messages held in one or more repositories 66. The messaging server also has access to information identifying voice messages that are stored as audio files in the same or a different repository 68.

As shown in FIG. 7, the UM server mediates between the repositories of a user's messages—a voice message server 140 and an email message server 142, for instance-and the accessing devices for those messages—PCs 144, phones 146, and mobile Internet-enabled devices 148. The UM server stores in a local database 150 information about each user 149, including (a) information required to access messages from the email server, including the name of the server and its communications protocol (e.g. POP3, IMAP4, HTTP, MAPI) and the user's password and ID 152, (b) preferences for that user 154, including whether he wishes words to be abbreviated ("United States" to "U.S." for instance) when he is reading email on a small-screen device, and (c) cached messages 156, including messages the user has accessed recently. The UM server also holds a table 191 that associates each of the devices 193 that are served by the server with the identity of the owner (or authorized user) of the device.

In general, the repositories and origin servers of messages, both voice and email, are distinct from the UM server, although in some cases the UM server may also be responsible for storing the messages, in which case the per-user system state would also contain the messages belonging to the user.

Because it is capable of transmitting messages to various different devices, the UM server will in some implementations contain a TTS (text to speech) subsystem, in order to deliver textual email messages to a person listening on a traditional phone over a "POTS" (plain old telephone system) line. In some cases, a TTS subsystem is a useful feature even for users who are accessing the UM server from an Internet-enabled mobile phone. For example, the mobile phone may offer only voice but not data service when the phone is out of range for digital data communication. In some cases, even when the handset is capable of digital data communication, the user may be able to listen to the phone but not read the phone's display, for example when driving or if the user is visually impaired. In these cases, the TTS component within the UM server enables user access to email messages.

The messaging server manages the switches between a text message state-in which the user of the mobile phone can view the text of email, text, and FAX messages on his phone's display 70—and a voice message state, in which the user can listen to voice messages on the speaker 72 of the phone. In general, the UM messaging server may interface with a wide range of data sources other than those depicted. In some cases the messaging server may not fetch requested email messages from the email repository in direct response to requests, but instead may download the messages, cache them, and manage them locally (in the messaging server).

The state of the system (text or voice) is determined by the choices that a user makes with respect to a list of messages that are presented on the display of his phone. As explained later, the entries in the displayed list are presented in essentially the same manner whether they relate to voice messages or text messages. And the user performs the same action to invoke a message on the list whether the message is a voice message or a text message. Transparently to the user, the browser and the server cooperate to cause the state of the system to shift between voice messages and text messages depending on the message selected by the user. Voice messages are delivered in audio through the phone and text (character-based) messages are delivered as characters and displayed to the user on the display of the telephone.

As shown in FIG. 3, the process of using the system of FIG. 2 begins with the user starting the web browser on his mobile phone and using (80) a universal resource locator (URL) to establish a communication with the messaging server, for example, by keying the URL explicitly into the browser or by selecting a predefined bookmark corresponding to the URL.

A user authentication process (82) is performed at the server. The messaging server receives the request to log in from the phone and, in response, transmits to the phone a web page containing an authentication form, prompting for a user ID and password. The user keys in his user ID and password and submits the information to the messaging server. Upon receipt and verification of this information, the messaging server validates the user against an internal database of registered users 65 (FIG. 2) For this purpose, the database includes a list of (userid/password) pairs, to permit validation of a putative user when he submits these two pieces of information. If the submitted information doesn't match any registered user entry in the database, the messaging server returns a "please try again" web page to the user's browser, with the same form as before.

In some cases, the user authentication process may be abbreviated. For example, most Internet-enabled phones transmit, along with an HTTP GET request for data, information which uniquely identifies the handset to the server. This information is transmitted automatically in the HTTP headers. For a UP-style WAP device, for example, the information appears in the 'x-up-subno' (subscriber number) field of the headers. When the handset can be uniquely identified by UM server by automatic inspection of the HTTP request, the UM server can consult its database of devices to see if a user has already registered the device with the server. If this is the case, the UM server already knows the ID of the user, and can elide this query, prompting only for the user's password. (See FIG. 7). Whether a particular implementation allows users to register their devices with the UM server or not is dependent on the policy enacted by a system administrator.

Once a user has been authenticated, the message server delivers (84) to the user a web page, in a markup language compatible with the requesting device, containing a list of hyperlinked messages, sorted in reverse chronological order. FIG. 4 shows the list of available messages 120 displayed (86) to the user. Both email messages 122 and voice messages 124 are listed. The display may be scrolled left and right to display an entire entry in the list. All of the entries in the list are displayed in a similar manner. The display shown in FIG. 4 is only one example. There are a variety of ways in which the entries can be displayed. In FIG. 4, each entry occupies a single line of the display. The line begins with an index 126 identifying the number of the message in the list. The index is followed by a message title 128. In the case of voice messages the title is simply "voice message". If the UM server has access to the phone number or other identifying information about the caller, that too can be displayed. For text messages, the title is the name of the sender of the message. After the title, the time 130 when the message was sent appears.

The user may then select (88) any of the messages for review by moving a cursor 132 up and down to reach the message of interest and then pressing the SEND button 134. A variety of other techniques could be used to enable the user to select a message, including a touchscreen or pointing device, available on some mobile devices.

Each of the lines in the list 120 represents a link to the message identified in the line. If (90) the user selects a link corresponding to an email message (e.g., message 1, 2, or 4), the browser 73 in the phone sends a corresponding HTTP request (92) for that message to the UM server 64. The UM server software responds by fetching the requested message from the email message repository and delivering (94) the message (in the form of a web page, using HTTP) to the phone. The browser on the phone then displays the message to the user.

To deliver the message to the phone may require that the UM server transform the content of the original message-which may be in a format not compatible with the target device or which may contain attachments in a format not compatible with the target device-so they are compatible with the target device. Delivering the message to the phone also requires that the UM server honors the constraints of the target device, including memory limitations which impose an upper limit on the file size of a document delivered to the device. Performing stateful "repurposing" of an email message is described in U.S. patent application Ser. No. 09/898,134, filed on Jul. 3, 2001, and incorporated by reference.

If the user selects a link corresponding to a voice message (e.g., message 3 or 5), the browser or the phone operating system fetches the phone number corresponding to the link, and the phone dials (96) the phone number of an automatic voice messaging system 68 followed by a pause, followed by a validation code uniquely identifying the user and message to the voice messaging system. Thus the dialing sequence is:

(phone number) (pause) (validation code—user ID and message #)

The call is made through the user's wireless carrier 69. The voice messaging system 68 answers the call, processes the validation code, and plays back the identified message as audio through the wireless carrier 69 and the phone's speaker, and then disconnects. In other schemes, the user can indicate in the displayed more than one voice message that he wishes to receive, and the voice messaging system plays back all of those messages before disconnecting. In other schemes, after playing the required message, the voice messaging system may not terminate the call, but instead offer the user a menu of options, including any features that are otherwise available from the voice messaging system (such as replay, delete, save, forward).

When the browser or operating system of the phone determines that the call has disconnected, the display of the pending list of available messages is refreshed. In the case of an email message that has been displayed, when the user indicates that he is finished reviewing the email message, the message list is again displayed.

The information that is displayed to the user in the message list and the manner in which it is displayed and in which the user interacts with and controls it can include a wide variety of features not shown in the example of FIG. 4.

The information displayed to the user can be seen in the source markup language document of FIG. 5 that is sent from the server to the browser. The code defines the selection that the user can make among five listed messages. Each option includes the text 85 to be displayed to the user and a related URL. In the case of email messages, the URL 81 is directed to the messaging server www.x.com and identifies the message by a hash 87 to be described later. In the case of voice messages, the URL 83 is directed to a telephone number, wp/mc;+18005551212 of the voice message system in which the voice message is stored and identifies the message by a code that identifies the user and the requested message to the messaging server. When the messaging server answers the phone call, it hears the code, validates the user based on the code, and deliver the requested message.

When the user requests a message, if the stored hyperlink is of the form http://www.xyz.com/foo, the browser sends the HTTP GET request "foo" to the server www.xyz.com. If the hyperlink is of the form wp/mc;+18005551212 34526, then the phone dials the phone number 1-800-555-1212 followed by the code 34526.

Maintaining State

Given that HTTP is a stateless protocol, the message server must have a way to "remember", between transactions with the phone client, (a) which user is using the phone, and (b) which message the user wants to access.

One typical way to do this uses a Java servlet mechanism to embed, in the URLs included in the list provided from the server to the browser, the information needed to authenticate the user and identify the desired message. The server knows the user's ID and the message identifier when it assembles the list to be sent to the browser.

When the user selects a particular message, his browser returns an HTTP request that includes the message number and the user ID. For instance, imagine that the URL for the messaging server is http://www.x.com and the user's ID is 123456. The URL corresponding to a request to 'view email message #6 for this user' might be, in this case, http://www.x.com/email jsp?u=123456&m=6

When the user selects this email from the displayed list, the browser would send an HTTP request for "/email?u=123456&m=6" to the messaging server, assuming the messaging server is assigned to the IP address whose name is http://www.x.com.

Because the messaging server would have stored the information about the messages, the messaging server would recognize the return URL as a request for the sixth email message for user 123456's email, and would generate the appropriate web page to send back to the user. One could think of the http://www.x.com as the address on the outside of the envelope and the /email?u=123456&m=6 as the "payload", or information inside the envelope.

Other approaches could also be used to track sessions with users.

Security

Scenario 1: Imagine that a user accesses his messages using a mobile phone and then drops or misplaces the phone. Suppose another person picks up the phone. Whether the web browser is still on or is off, it is likely that the page containing the links to the user's messages still resides in the browser's cache. It would be unfortunate if this second person could access the user's messages simply by picking up the phone and clicking on one of the 'message' links. In some settings (for instance, HIPAA confidentiality requirements in medicine), a system with such a security gap would not permitted to be used at all.

Scenario 2: Equipped with the knowledge of another person's user ID, a malicious third party could, even without physical access to the user's phone, access that person's messages simply by visiting (for example) the URL http://www.x.com/email.jsp?u=123456 m=4 to see the user's fourth most recent message.

These concerns can be reduced using a time-sensitive encryption technique, which we describe for the encoding of URLs first for email messages and then for voice messages.

In examples of this technique, rather than using the servlet request "/email.jsp?u=123456&m=6" to convey "the sixth message for user 123456", the messaging server instead encrypts the (user, message) information of inclusion in the message list that it sends to the browser.

As shown in FIG. 6, first, the server software prepends (102) the index number of the message in the list of available messages to the user ID, in this case yielding the string "6123456", called x in the following table. The user ID is a number assigned by the messaging server uniquely to each user. Then, the server software applies (104) a (one-way) hashing function h to this string to generate an n-digit sequence, where n is an integer such as 8. The server then stores (106) the hashed n-digit sequence, along with the original number and the current time, in a lookup table in the server. The contents of the table for a given user might be as follows:

| Hash h(x) | Original Number x | User | Message Number | Timestamp |
|---|---|---|---|---|
| 18573028 | 2948563 | 948563 | 2 | 11.02.01 @ 23:11.03 |
| 36465659 | 119223001 | 223001 | 119 | 11.02.01 @ 23.11.09 |
| 99550023 | 22140199 | 140199 | 22 | 11.02.01 @ 23.11.11 |

Thus, rather than encoding the userID and message number explicitly in the URL that is included in the list sent to the phone, the message server instead applies the hashing function to these two values as described, stores an entry in the hash column, and encodes the URL (108) in the following way:

http://www.x.com/email.jsp?x=[hash]

For example, assume that h(119223001)=36465659. Then instead of using http://www.x.com/email.jsp?u=223001&m=119, the server would use http://www.x.com/emailjsp?x=36465659

When the messaging server receives from the phone, via HTTP, the servlet request "/email jsp?x=36465659", the server consults the currently active table of hashes, decodes the hash into a (user, message number), and delivers to the phone the desired message number for that user.

As an extra security precaution, the server continuously sweeps through the table above, clearing out rows that are older than a preset value (five minutes old, say). If the messaging server receives a request for a hash not found in the table, the messaging server responds by requiring that the user provide his ID and password again.

Under this policy, a malicious user in possession of a user's ID will be unable to access the user's messages, unless he also has the user's password (which would enable him to re-register as the user). Even obtaining physical access to the user's phone would not help the malicious user as long as the authorized user wasn't actively using the phone to interact with the messaging server in the previous five (say) minutes.

An analogous mechanism works for dialing into a messaging server through the telephone. In this case, the http://www.x.com is replaced with the phone number of the automated telephone-based messaging server, say 800-555-1212. The payload, which in the case of HTTP was the servlet request "/emailjsp?x=9234239", is now a provided as a sequence of digits (the hash discussed above, which validates the user) following the phone number itself.

Serving Emails

Information about one way to configure emails and attachments for rendering on a device of limited capability, such as the phone discussed above, can be found in U.S. patent application Ser. No. 09/898,134, filed Jul. 3, 2001, and incorporated by reference.

As discussed there, a transformation server reconfigures and segments documents so they may effectively be viewed on the mobile phone's display. The transformation server acts as a proxy for the mobile phone, intercepting requests from the phone for messages, fetching the requested messages from the messaging server, and reconfiguring the messages for transmission to and display on the phone. Honoring the phone's document-size limits, the transformation server partitions the reconfigured message into segments, each of digestible size for the phone. The server transmits the first of these segments to the phone and caches the rest, delivering them on request. The transformation server acts as a client to the messaging server, communicating via POP or IMAP or HTTP or any other mail communication protocol to fetch messages from the messaging server. After transforming the messages for display on the mobile phone, the transformation server transmits the message to the phone through a gateway server, using HTTPS.

Other implementations are also within the scope of the following claims.

For example, although the description has discussed the example of receiving messages on a wireless phone, other receiving devices might be used, including non-wireless devices connected by dialup connection or through a local area network or wide area network to the messaging server. The devices need not be phones but could be personal digital assistants, notebook computers, desktop computers, or any other kind of electronic device. The kinds of messages that may be received are not limited to the ones mentioned earlier. Any kind of message could be received. Although we have used the words audio, voice, and video to describe certain kinds of messages received, other kinds of multimedia messages may also be handled in similar ways.

The description presented above suggests an example in which the message server and the repositories have particular relationships and configurations. But a wide variety of message server/repository configurations including any number of different units interconnected in a variety of ways would work. For example the repository can be part of the message server, and the message server can be partitioned into a number of different units. There can be multiple messages servers and multiple repositories.

Protocols other than WML and HTTP may be used for communication of requests and lists of messages and for other features of the system. Various platforms for embedding of the locators can be used. The examples given earlier are only examples.

Implementation of the features and techniques discussed earlier can be done in hardware, firmware, software or any combination of them. The phone or other device can have a variety of underlying operating systems.

The communication between the server and the phone or other device need not be through the Internet or other TCP/IP network. WAP and some other handheld Internet-enabled devices do not always use TCP/IP as the communication protocol.

The invention claimed is:

1. A method comprising
    enabling a user of an electronic device to make successive selections of messages from a list of messages displayed on the device, the list including both voice messages and text messages, the selections including voice messages and text messages in any arbitrary order, and
    without requiring any different action by the user, switching back and forth between responding to selections of voice messages by audibly playing back the messages to the user and responding to selections of text messages by displaying at least portions of the messages such that a selected message is provided for display in a presentation mode associated with the selected message without further user interaction beyond selection of the selected message.

2. A method comprising
in response to a user selecting a voice message identified on a display of an electronic device, automatically initiating a call to a voice message system on which the voice message is stored, having the voice message system authenticate the call, and receiving an audibly played back version of the voice message from the voice message system, and
providing a selected message for display in a presentation mode associated with the selected message without further user interaction beyond selection of the selected message.

3. A method comprising
at an electronic device, enabling a user to invoke links associated with voice messages and non-voice messages to be retrieved, the links being displayed to the user, and
at the electronic device, switching automatically between responding to invocation of a voice message link by dialing a telephone number associated with the link, and responding to invocation of a non-voice message link in a manner other than dialing a telephone number such that a selected message is provided for display in a presentation mode associated with the selected message without further user interaction beyond selection of the selected message.

4. A method comprising
at an electronic device, in response to selection by a user of a voice message to be retrieved, dialing a string that includes a phone number of a voice message system and digits that are sufficient to enable the voice message system server to identify the user and the selected voice message, and
providing a selected message for display in a presentation mode associated with the selected message without further user interaction beyond selection of the selected message.

5. A method comprising
at a mobile electronic device, receiving data that (a) identifies a remotely stored message belonging to a user of the mobile electronic device and (b) includes information that (i) associates the message with the user and (ii) is encoded to restrict unauthorized access by others,
in response to a request by the user for retrieval of the message, returning the encoded information to a server for use in authentication, and
providing a selected message for display in the presentation mode associated with the selected message without further user interaction beyond selection of the selected message.

6. The method of claim 5 in which the information is generated by a hashing algorithm.

7. The method of claim 5 in which the data includes an index identifying the message from among other messages belonging to the user.

8. The method of claim 5 in which the encoded information is also stored for use by the server and is automatically deleted from the server based on its aging.

9. A method comprising
receiving from a user at an electronic device a request to retrieve a message directed to the user, the message having one of at least two different presentation modes by which it is enabled to be revealed to the user at the electronic device,
retrieving the message using one of at least two different communication networks depending on a presentation mode by which the message is enabled to be revealed, and
providing a selected message for display in the presentation mode associated with the selected message without further user interaction beyond selection of the selected message.

10. The method of claim 9 in which the electronic device comprises a wireless device.

11. The method of claim 10 in which the wireless device comprises a telephone.

12. The method of claim 9 in which one of the modes comprises performance of a multimedia message.

13. The method of claim 12 in which the multimedia message comprises a voice message.

14. The method of claim 9 in which one of the modes comprises displaying characters.

15. The method of claim 9 in which the retrieving comprises requesting the message from a message server.

16. The method of claim 9 in which one of the modes comprises performance of a multimedia message, and the retrieving of the multimedia message comprises initiating a dial-up phone call to a message server.

17. The method of claim 16 in which the multimedia message comprises a voice message and the retrieving includes receiving a spoken version of the voice message.

18. The method of claim 9 in which one of the modes comprises displaying characters, and the retrieving of the message comprises sending a request through a network to a message server.

19. The method of claim 9 also including
receiving at the electronic device information identifying messages directed to the user, and
providing the information to the user at the electronic device for selection of a message by the user.

20. The method of claim 19 in which the information includes uniform resource locator information that enables accessing the messages through at least one of the communication networks.

21. The method of claim 19 in which the information includes a phone number at which a message can be retrieved.

22. The method of claim 19 in which the identifying information is received through a communication network.

23. The method of claim 19 in which the identifying information includes information identifying a user and a message number associated with each of the messages.

24. The method of claim 23 in which the information identifying the user and the message number is encoded securely.

25. The method of claim 24 in which the encoded information is included in the request to retrieve.

26. The method of claim 19 in which information is stored remotely from the electronic device, the information permitting a server to respond to selection of the message even though communication between a server and the electronic device conforms to a stateless protocol.

27. A method comprising
informing a user of an electronic device of messages that are available for retrieval, each of the messages having one of at least two different presentation modes by which it is enabled to be revealed to the user at the electronic device,
receiving from the user a selection of one of the messages to be retrieved, the selection being made in a manner that is unrelated to the presentation mode by which it is enabled to be revealed,
revealing the message to the user in its presentation mode,
receiving from the user a selection of another one of the messages to be retrieved, the selection being made in a manner that is unrelated to the presentation mode by which the other message is enabled to be revealed, and revealing the other message to the user in its presentation mode, wherein revealing the message comprises revealing the message in the presentation mode associated with the message without further user interaction beyond selection of the selected message.

28. The method of claim 27 in which the informing includes displaying a list of the messages to the user.

29. The method of claim 27 in which the receiving includes enabling the user to indicate a selection through a graphical user interface.

30. The method of claim 27 in which the revealing includes displaying a text message or playing a voice message.

31. A method comprising providing to an electronic device, information that is configured to enable the electronic device:

to retrieve messages using at least two different communication networks depending on a presentation mode by which each of the messages is enabled to be revealed, the electronic device being enabled to make a request for a message, and to enable a user to select messages in a manner that is unrelated to the presentation mode by which the messages is enabled to be revealed, and to display a selected message in the presentation mode associated with the selected message without further user interaction beyond selection of the selected message.

32. The method of claim 31 in which the information that is provided to the electronic device is expressed in a mark-up language.

33. The method of claim 31 in which the information that is provided to the electronic device is encoded to prevent loss.

34. A method comprising enabling a user of an electronic device to make a selection of a message to be retrieved from a message server, in response to the selection, issuing a string of characters that includes a phone number that is associated with the message and is capable of causing the electronic device to execute a phone call to the server, and a character string that identifies the user and enables the server to authenticate the user, and providing the selected message for display in the presentation mode associated with the selected message without further user interaction beyond selection of the selected message.

35. The method of claim 34 in which the phone number is stored as part of a hyperlink.

36. An apparatus comprising a processor and a memory including computer program code, the memory and the computer program code configured to, with the processor, cause the apparatus to:

enable a user of an electronic device to make successive selections of messages from a list of messages displayed on the device, the list including both voice messages and text messages, the selections including voice messages and text messages in any arbitrary order, and without requiring any different action by the user, switch back and forth between responding to selections of voice messages by audibly playing back the messages to the user and responding to selections of text messages by displaying at least portions of the messages such that a selected message is provided for display in a presentation mode associated with the selected message without further user interaction beyond selection of the selected message.

37. An apparatus comprising a processor and a memory including computer program code, the memory and the computer program code configured to, with the processor, cause the apparatus to:

receive from a user at an electronic device a request to retrieve a message directed to the user, the message having one of at least two different presentation modes by which it is enabled to be revealed to the user at the electronic device, retrieve the message using one of at least two different communication networks depending on a presentation mode by which the message is enabled to be revealed, and provide a selected message for display in the presentation mode associated with the selected message without further user interaction beyond selection of the selected message.

* * * * *